US011165644B2

(12) United States Patent
Bradshaw et al.

(10) Patent No.: US 11,165,644 B2
(45) Date of Patent: Nov. 2, 2021

(54) ENDPOINT ABSTRACTION FOR SERVICE-TO-SERVICE COMMUNICATION

(71) Applicant: Home Box Office, Inc., New York, NY (US)

(72) Inventors: Dexter Paul Bradshaw, Bainbridge Island, WA (US); Jeffrey Stamerjohn, Mercer Island, WA (US); Jinjiang Zeng, Mercer Island, WA (US)

(73) Assignee: HOME BOX OFFICE, INC., New York, NY (US)

( * ) Notice: Subject to any disclaimer, the term of this patent is extended or adjusted under 35 U.S.C. 154(b) by 94 days.

(21) Appl. No.: 16/657,262

(22) Filed: Oct. 18, 2019

(65) Prior Publication Data

US 2020/0052958 A1 Feb. 13, 2020

Related U.S. Application Data

(63) Continuation of application No. 15/435,940, filed on Feb. 17, 2017, now Pat. No. 10,491,474.

(51) Int. Cl.
*H04L 12/24* (2006.01)
*H04L 29/08* (2006.01)
*H04L 29/06* (2006.01)

(52) U.S. Cl.
CPC ............ *H04L 41/082* (2013.01); *H04L 41/08* (2013.01); *H04L 41/5054* (2013.01); *H04L 63/0281* (2013.01); *H04L 67/1002* (2013.01); *H04L 67/16* (2013.01); *H04L 67/28* (2013.01); *H04L 67/32* (2013.01); *H04L 67/34* (2013.01)

(58) Field of Classification Search
CPC ... H04L 41/08; H04L 41/082; H04L 63/0281; H04L 63/10; H04L 67/16; H04L 67/28; H04L 67/325; H04L 67/02; H04L 41/5054; H04L 67/32; H04L 67/34; H04L 67/1002
See application file for complete search history.

(56) References Cited

U.S. PATENT DOCUMENTS

| 9,317,612 | B1 | 4/2016 | Camplejohn et al. |
| 2007/0156859 | A1* | 7/2007 | Savchenko ............. H04L 67/02 709/220 |
| 2008/0104258 | A1* | 5/2008 | O'Neill ................. H04L 67/325 709/228 |

(Continued)

OTHER PUBLICATIONS

Korean Office Action for Korean Patent Application No. 10-2019-7026021 dated Sep. 24, 2020, 13 pages.

(Continued)

*Primary Examiner* — Jungwon Chang
(74) *Attorney, Agent, or Firm* — Amin, Turocy & Watson, LLP (57) ABSTRACT

The described technology is generally directed towards an abstraction and file model used for subscriber service and publisher service communication. The abstraction and file model enables dynamically changing the underlying communication mechanisms and introducing optimizations such as caching (reducing latency) and batching (improving bandwidth utilization) transparently, without any change to the subscriber or publisher code. The abstraction also facilitates introducing intermediate lightweight message-oriented middleware and provides for transparently scaling communication.

20 Claims, 9 Drawing Sheets

(56) References Cited

U.S. PATENT DOCUMENTS

| | | |
|---|---|---|
| 2008/0256553 A1 | 10/2008 | Cullen |
| 2009/0319651 A1* | 12/2009 | Fang .................. G06F 9/54 |
| | | 709/223 |
| 2009/0328054 A1 | 12/2009 | Paramasivam et al. |
| 2013/0166703 A1* | 6/2013 | Hammer ............. H04L 63/10 |
| | | 709/220 |
| 2013/0297738 A1 | 11/2013 | Tarkoma |
| 2016/0057237 A1 | 2/2016 | Yang et al. |
| 2016/0323377 A1* | 11/2016 | Einkauf ............ H04L 29/0827 |
| 2017/0104641 A1 | 4/2017 | Bradshaw et al. |
| 2018/0096412 A1 | 4/2018 | Scott-Nash et al. |
| 2018/0288611 A1 | 10/2018 | Amin et al. |

OTHER PUBLICATIONS

Communication pursuant to Rules 161(1) and 162 EPC for European Application Serial No. 17833071.8 dated Sep. 27, 2019, 3 pages.

Office Action for U.S. Appl. No. 15/435,940 dated Mar. 27, 2019, 25 pages.

International Search Report and Written Opinion for International Application Serial No. PCT/US2017/068781 dated Apr. 6, 2018, 12 pages.

* cited by examiner

ENDPOINT ABSTRACTION FOR SERVICE-TO-SERVICE COMMUNICATION

CROSS-REFERENCE TO RELATED APPLICATION

This application is a continuation of, and claims priority to U.S. patent application Ser. No. 15/435,940, filed on Feb. 17, 2017, entitled "ENDPOINT ABSTRACTION FOR SERVICE-TO-SERVICE COMMUNICATION." The entirety of the aforementioned application is hereby incorporated herein by reference.

BACKGROUND

In distributed computing systems, a subscriber service comprises a service/network application that wants to use another service, referred to as a publisher service, which exports some functionality desired by the subscriber service. Service discovery in large-scale distributed systems is generally directed towards matching a subscribing service to the correct version of a published service.

Once matched, contemporary subscriber services and publisher services communicate in a static way. If there are communication-related changes that need to be made, such as to change service communication policies, methods, and/or the implementation (e.g., version), code changes to the subscriber service and/or publisher service code are needed.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, one or more aspects of the technology described herein are directed towards an abstraction and data model used in publisher service and subscriber service communication, which allows dynamic communication changes. One or more aspects include communicating a first set of service requests and responses thereto between a subscriber service and a publisher service via a proxy server, comprising, at the proxy server, using a first set of network communication data to communicate with the publisher service. Based upon a change to the first set of network communication data, the first set of network communication data is updated into updated network communication data. A second set of service requests and responses thereto are communicated between a subscriber service and the publisher service via the proxy server, comprising, at the proxy server, using the updated network communication data to communicate with the publisher service Other advantages may become apparent from the following detailed description when taken in conjunction with the drawings.

BRIEF DESCRIPTION OF THE DRAWINGS

The technology described herein is illustrated by way of example and not limited in the accompanying figures in which like reference numerals indicate similar elements and in which.

DETAILED DESCRIPTION

Various aspects of the technology described herein are generally directed towards abstracting away the communication mechanisms and policies used for communication between subscriber services and publisher services. The abstraction allows for subscriber service communication with a publisher service to be via an abstracted name, without the subscriber and/or publisher service code needing to be involved with communication policies, parameters, protocols, and implementation. A subscriber is able to request the services of a publisher by asking for "what" service it wants as opposed to "how" and/or the best way "how" to communicate with a target publisher. This is left to the underlying dynamically configured data (described in U.S. patent application Ser. No. 15/291,816, assigned to the assignee of the present application and herein incorporated by reference in its entirety) and the implementation of the endpoint abstraction.

The abstraction further allows for changes to the communication parameters and/or network to be transparently and/or dynamically made, including incorporating optimizations into the network and/or the communicating entities. For example, underlying network communication policies and optimizations such as caching and batching operations may be changed without changing subscriber service code or publisher service code. Similarly, communication mechanisms such as persistent queuing may be selectively turned on or off, as well as establishing the size of the persistent queue, according to virtually any criterion.

In one or more implementations, generally based upon and described in the aforementioned U.S. patent application Ser. No. 15/291,816, parameter data maintained in a configuration file is used to make a subscriber service's calls to a publisher service (instead of making calls via a static configuration). As a result of using such variable parameter data, from the perspective of the subscriber service, the publisher service becomes an endpoint abstracted into a name (identity) to which the subscriber service code makes its service requests. As a result, the subscriber service code need not know of any underlying communications data or other policies, protocols, or implementations needed for communication. In this way, transparent changes may be made to the communication parameter data and to the publisher service, as well as to other network entities (such as middleware, caches and so on), resulting in changed communication (e.g., policies and other operations) without changing the subscriber service's code.

A subscriber server is configured with a proxy server that communicates on behalf of a subscriber service using dynamically configurable communication parameters (as described in aforementioned U.S. patent application Ser. No. 15/291,816). The use of the dynamic configuration file data allows the use of "network communication data" including policies, methods, and implementations transparent to the client, including those set forth in TABLE 1:

TABLE 1

1. Producer (publisher)/consumer (subscriber) protocols,
2. persistent queuing,
3. exactly once communication,
4. at least once communication,
5. RPC (remote procedure call) communication (e.g., gRPC, Java ® RMI, OSF RPC, Microsoft ® RPC, Sun RPC),
6. Synchronous/asynchronous event messaging,
7. Light-weight message-oriented middleware such as a lightweight service broker or service bus. MoM infrastructure can potentially help scaling of communication and reduce message complexity of service-to-service calls between subscribers and publishers.
8. Message batching (box-cars) to improve communications bandwidth utilization.
9. Message caching to optimize latency between remote services.
10. Capability-based authentication and authorization between subscribers and publishers.
11. Transactional communications (atomic transactional guarantees on messages).
12. Security protocols for authentication, authorization, and levels of data integrity.

For example, upon detecting a state change related to a publisher service, (which may be a change made by the publisher service, possibly in response to detecting something like a network state change), in which the state change is indicated in a repository, the configuration information used by the subscriber service may be changed dynamically and in real time into modified configuration information, based upon the state change. The modified configuration information is then used to communicate between the proxy server and the publisher service, in which the changes occur without modification either to code of the publisher service or to code of the subscriber service.

Similarly, a network state change may be detected, such as high latency conditions, whether detected by a publisher, subscriber, by middleware, and/or an entity of the repository. When this occurs, for example, message caching may be turned on to speed up publisher service and subscriber service communications.

It should be understood that any of the examples herein are non-limiting. For instance, some of the examples refer to a proxy server and sidekick process having certain features and capabilities. However, the technology described herein is independent of any particular configuration of components, and any suitable such component or set of components may be used, including a custom-written component. Thus, any of the embodiments, aspects, concepts, structures, functionalities or examples described herein are non-limiting, and the technology may be used in various ways that provide benefits and advantages in data communication and data processing in general.

Figure 1:
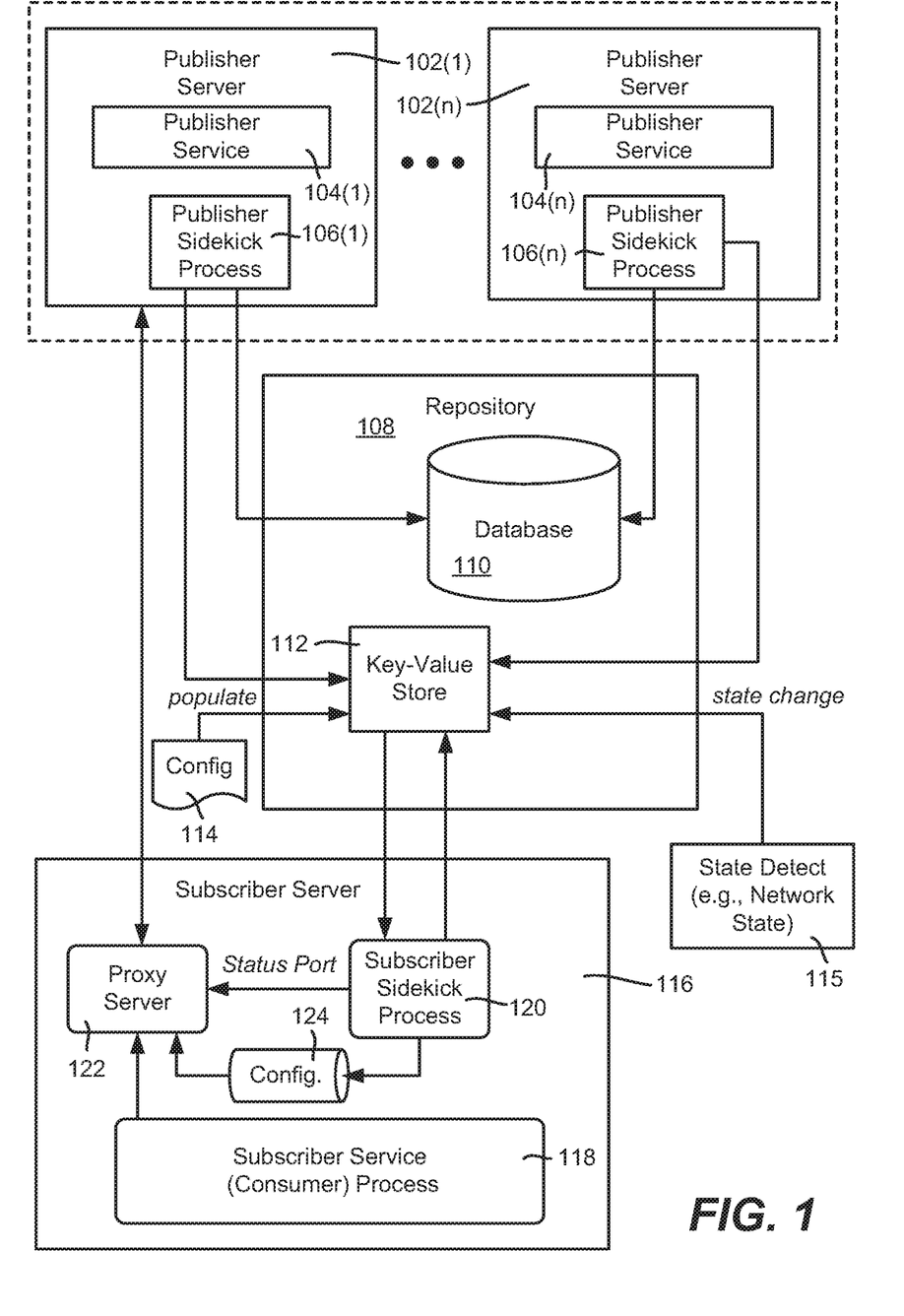
FIG. 1 is an example block diagram representation of a publisher service/subscriber service environment in which communication may be modified based upon changes to reconfigurable data, according to one or more example implementations.

As generally represented in the example implementation of FIG. 1, exemplified publisher servers 102(1)-102(n) each include a publisher service that exports some service functionality, shown as publisher services 104(1)-104(n), respectively. In a typical scenario, there may be thousands of publisher services (and thousands of subscriber services). Services can fail fast, and may be ephemeral, volatile and/or dynamic. Servers and/or services may be co-tenanted on the same virtual machine and/or physical machine; note that a virtual machine may or may not be the smallest unit of deployment, as there may be processes, threads, co-routines, containers and so on. Multiple instances of multiple versions of a service may be running concurrently. There may be multi-datacenter and cross-regional access to deployed services. In one or more implementations rapid deployment is available to support automatic scaling to react to workload peaks, along with integrated load-balancing across service instances.

As described herein, each publisher server 102(1)-102(n) includes a publisher service registration component that runs as a publisher sidekick process, shown as publisher sidekick processes 106(1)-106(n), respectively. Each of the publisher sidekick processes 106(1)-106(n) provides for service registration to a repository 108, as well as performing other operations such as health check-related operations.

In general, the repository 108 is a highly-available, distributed repository including a database 110 that maintains the publisher services' registrations. As described herein, the repository 108 also includes or is coupled to a service registry comprising a key-value store 112, (or multiple key-value stores), which may be monitored for changes related to the registered publisher services 104(1)-104(n). In one or more implementations, the repository is not a database as conventionally understood, but instead comprises the key value store 112. Some repositories use a hierarchical file system for organizing data, while other repositories may simulate a hierarchy in a flat key-value store by storing the directory path to an item as a key.

The database 108 and/or key-value store 112 may be updated by the publisher sidekick processes 106(1)-106(n). The repository 108 including the database 110 and/or key-value store 112 also may be configured/updated/populated by an external configuration source 114, such as an administrator, automated process, and so on. Another way to update the repository 108 is with state information 115, such as current network state data, including latency times and the like. As will be understood, any state data may be used to make changes to how any one publisher or group of publishers communicates with any one subscriber or group of subscribers, including time of day, an enhanced security operating state, and so on.

FIG. 1 also shows a subscriber server 116 including a subscriber service process 118, subscriber sidekick process 120 and proxy server 122. As described herein, the subscriber service process 118 makes service calls through the proxy server 122, which uses a configuration file 124 (and/or other suitable data structure, including in-memory accesses by the proxy server 122) to communicate with a discovered publisher service, exemplified in FIG. 1 as the publisher service 104(1). There may be more than one proxy server and/or more than one configuration file.

Note that the technology described herein allows a service publisher to be a subscriber to other services, and vice versa. This allows chained service-to-service calls, e.g., where Service A calls Service B which calls Service C which calls Service D and so on.

Service discovery in the environment exemplified in FIG. 1 may generally follow the service discovery pattern for modern distributed architectures. However, the publisher sidekick process (e.g., 106(1)) may provide for enhanced generic service registration while the subscriber sidekick process 120 may provide for enhanced service discovery, e.g., to better match publisher capabilities to those desired by subscribers. The publisher sidekick process (e.g., 106(1)) and the subscriber sidekick process 120 also participate in health checking, which in general removes unhealthy and/or non-communicating publisher services from the system. The repository 108 handles service discovery out-of-band of the application. Service discovery components run locally on the machine at well-known ports. Service discovery may be abstracted away, with no need to find discovery service publisher bindings.

Figure 2:
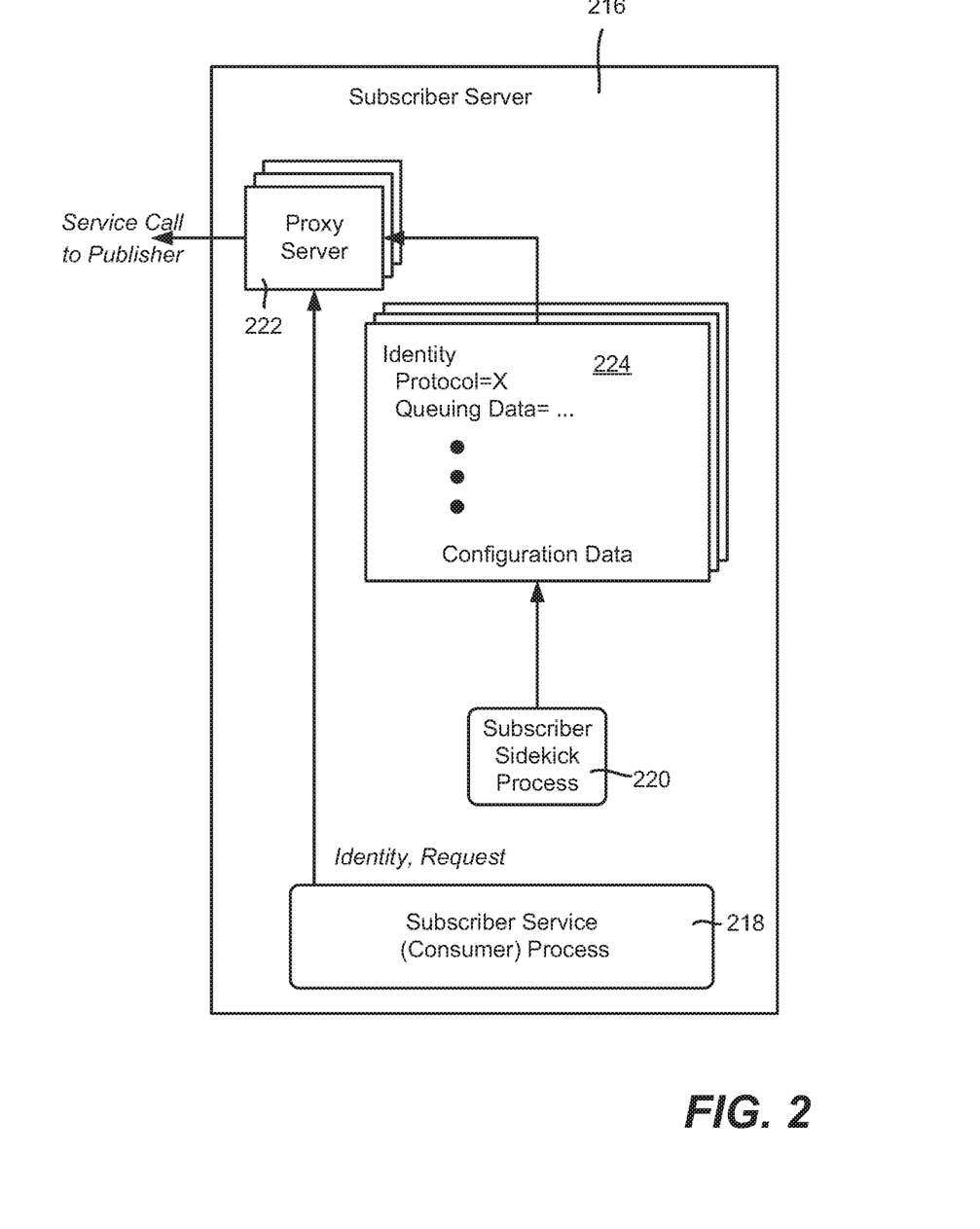
FIG. 2 is an example block diagram representation of a subscriber service using variable configuration data for communicating with a publisher service, according to one or more example implementations.

Once discovered and communicating, as generally represented in the example implementation of FIG. 2, during operation the subscriber service provides a request directed to an identity (name) of a discovered publisher service. The proxy server 222 uses appropriate configuration data 224 to make the service call to the publisher; (example service calls include requests such as /whoareyou, /version, /trouble, /clearSkies, /setDelay?ms= . . . , /shutdown . . . and so on. In this way, the subscriber service 218 need not have any knowledge of the publisher service other than its identity.

Note that FIG. 2 shows the capability of having multiple proxy servers, e.g., each one having an associated set of configuration data. It is feasible for two or more proxy servers to share the same set of configuration data, e.g., for multiple instances of the same publisher service. It is also feasible for one proxy server to have multiple sets of associated, configuration data, e.g., for requests associated with Identity1 use configuration dataset1, for requests associated with Identity2 use configuration dataset2, and so on.

In general, the subscriber sidekick process writes the configuration data, such as to memory accessed by the proxy server. In this way, dynamic changes are allowed, although any changes may need to be transactional so that the proxy server does not use inconsistent data as the change is being written.

Figure 3:
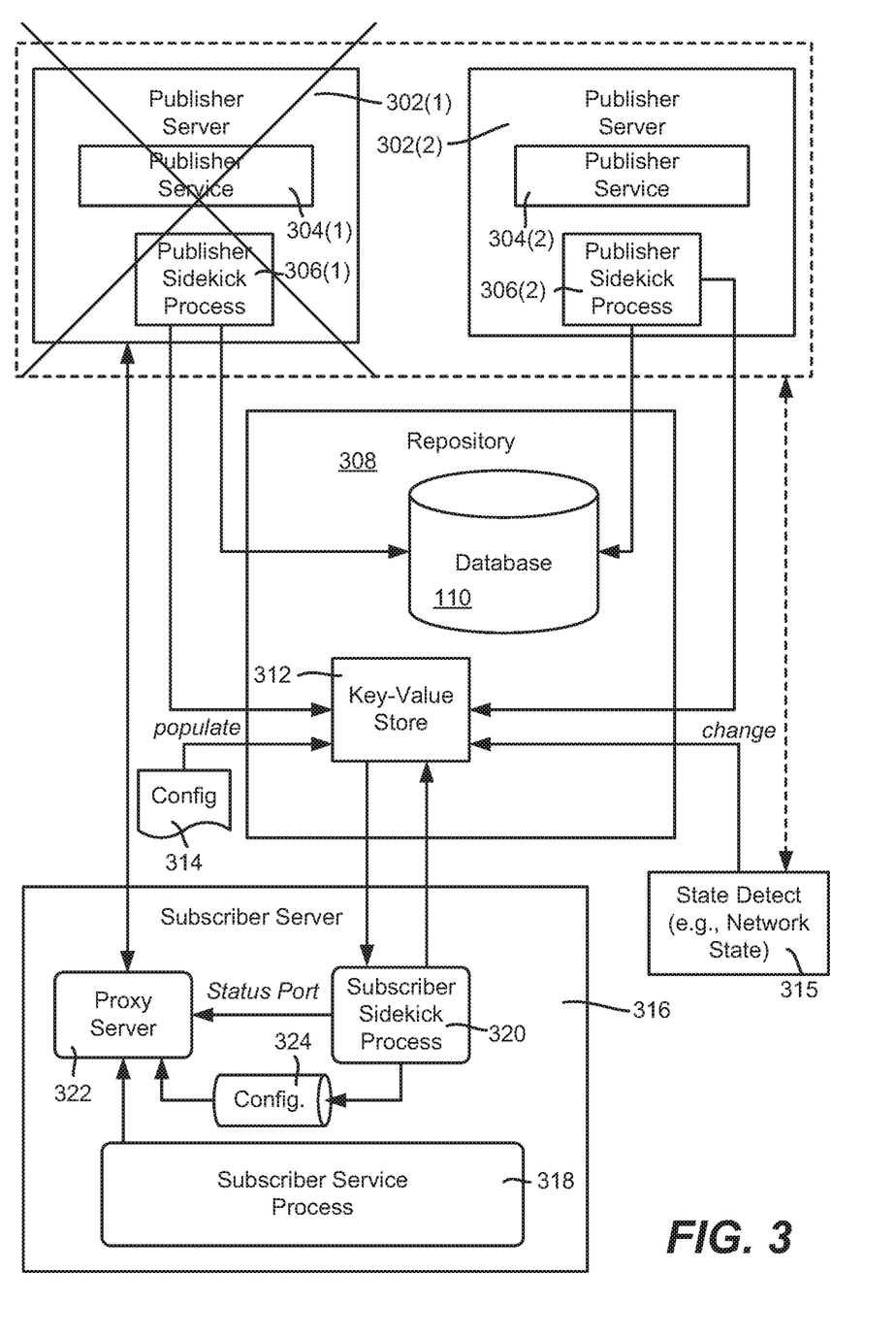
FIG. 3 is an example block diagram representation of how a subscriber service may change publisher services while still remaining operational, including when the new publisher service has different communication-related data, according to one or more example implementations.

FIG. 3 shows one situation in which a subscriber service 318 can continue operating without significant interruption when a publisher server 302(1) and its service 304(1) goes down, (which is one type of state change). In this example, consider that the subscriber sidekick process 320 is participating in health checking operations and recognizes that the publisher service has failed, or is otherwise notified of its failure, e.g., via the repository. In this event, the subscriber sidekick process queries for a replacement publisher service, e.g., publisher service 304(2) and publisher server 304(1).

Consider that, for example, the publisher service 304(2) is a different version, uses a different protocol, or uses virtually any other communication parameter set forth in TABLE 1. If the subscriber service 318 is able to use the communication parameters of the publisher service 304(2), then the configuration data 324 is updated, and requests are sent to the replacement publisher server. Only the identity may be changed, which may be a straightforward change built into the subscriber code or the identity may be remapped via an entity in the subscriber server 316; for example, the proxy server may be instructed to substitute NAME2 for NAME1 requests until otherwise instructed.

In this way, an entirely new publisher service with different communication parameters may be used transparently and without any change to the subscriber service code (other than to perhaps notify the subscriber service of a name change, unless remapping accomplishes the same result). Note however that not all publisher services may be able to be used; for example, if a publisher service only has exactly once communication semantics and the subscriber service needs at least once communication, then the subscriber sidekick process will not select that publisher for replacement.

Figure 4:
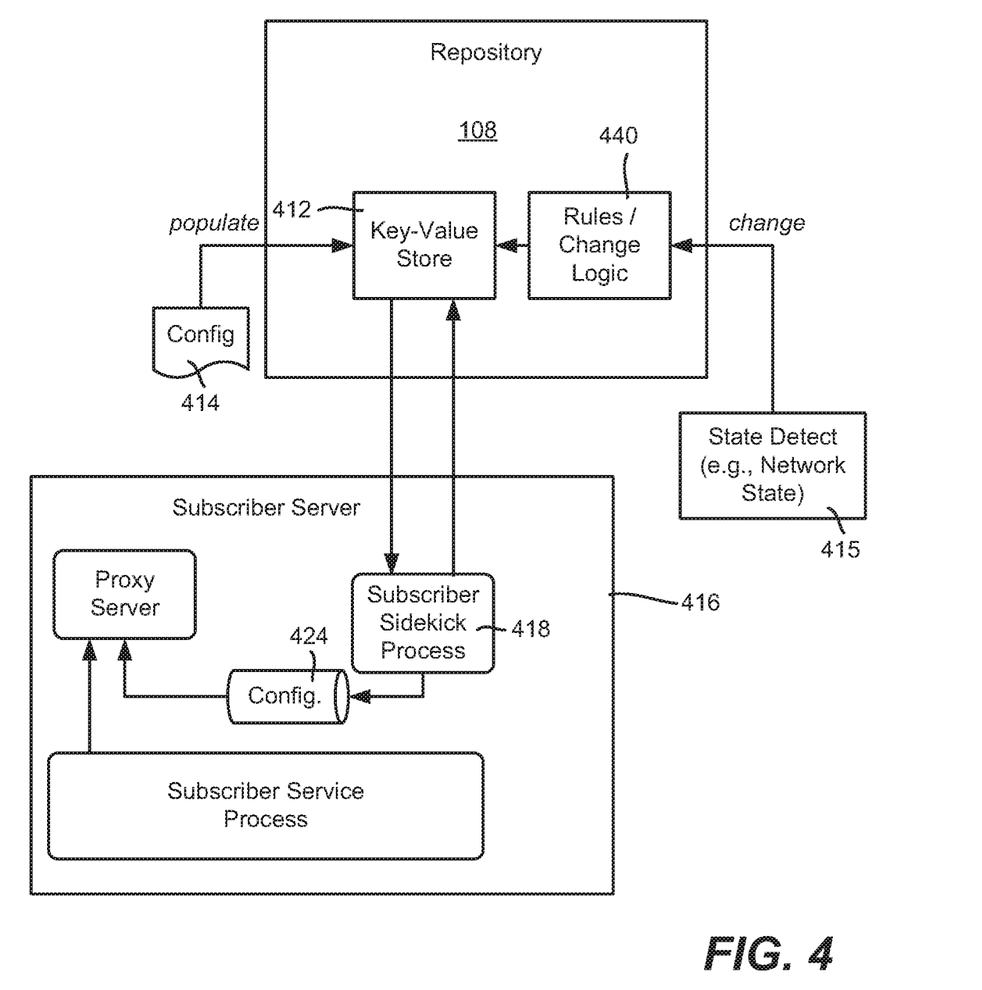
FIG. 4 is an example block diagram representation of how state detection, such as corresponding to a change in network state, may be used to dynamically change communication of a subscriber server, according to one or more example implementations.

FIG. 4 shows another example of how a change may take place that results in different communication data being used, without any change to the subscriber code. In the example of FIG. 4, consider that some network state has changed, such as a high latency condition. Rules/change logic 440 may write or update one or more key-value entries in this situation. For example, certain publisher entities may be able to turn on caching and/or batching to help deal with high latency. If so, such publishers may be notified to make this change or changes. Alternatively, new publishers that use caching and/or batching may begin to replace other publisher services for at least some subscribers.

Figure 5:
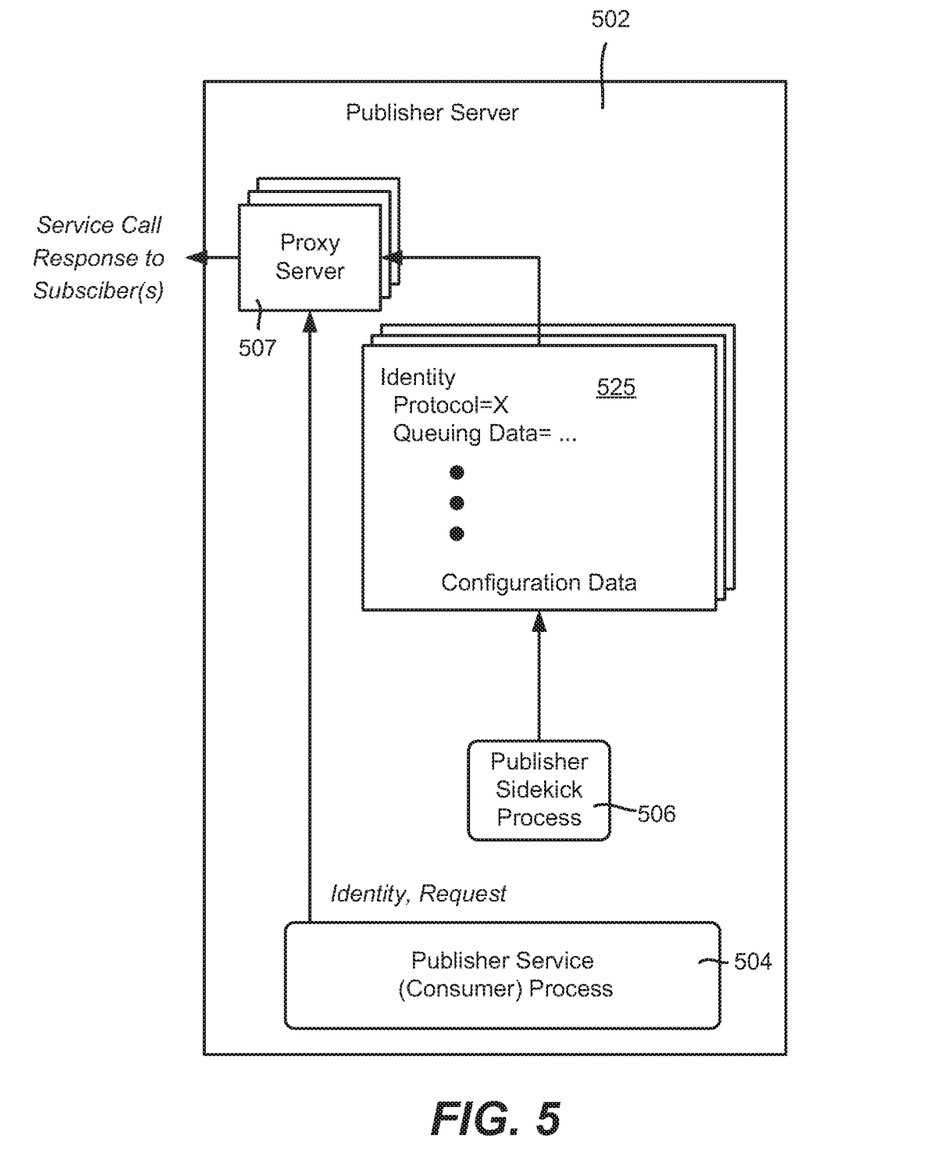
FIG. 5 is an example block diagram representation of how a publisher service may change its communication data while still remaining operational, including when the publisher service has different communication-related data, according to one or more example implementations.

Note that as represented in FIG. 5, a publisher service 504 may have at least some variable configuration data 525, and may use a proxy server 507. An alternative is to have the publisher service code written to facilitate making such changes, however there are known advantages to changing data rather than code and have data-driven operations and behavior.

Certain changes need not be reflected in the subscriber service configuration data; for example, whether a publisher service has turned on caching may be irrelevant to the subscriber service. However, the subscriber sidekick process may need to know about the change, and may choose to not allow the change, basically considering any such change to a publisher to be a failure of that publisher service. For example, if a subscriber service cannot allow caching, e.g., because stale data is not acceptable in a given subscriber service scenario, then that subscriber service cannot use a publisher with caching. Thus, the subscriber sidekick process needs to request a publisher service that does not use caching, or in which caching may be bypassed, and decouple the subscriber service from any publisher service that has changed to use caching. Another alternative is that the subscriber service can allow caching, but needs to instruct the publisher service to refresh its cache within some time frame that the subscriber service controls, and/or provide an expiry timestamp with any returned cached data so that the subscriber service can determine whether the data can be used or not.

Figure 6:
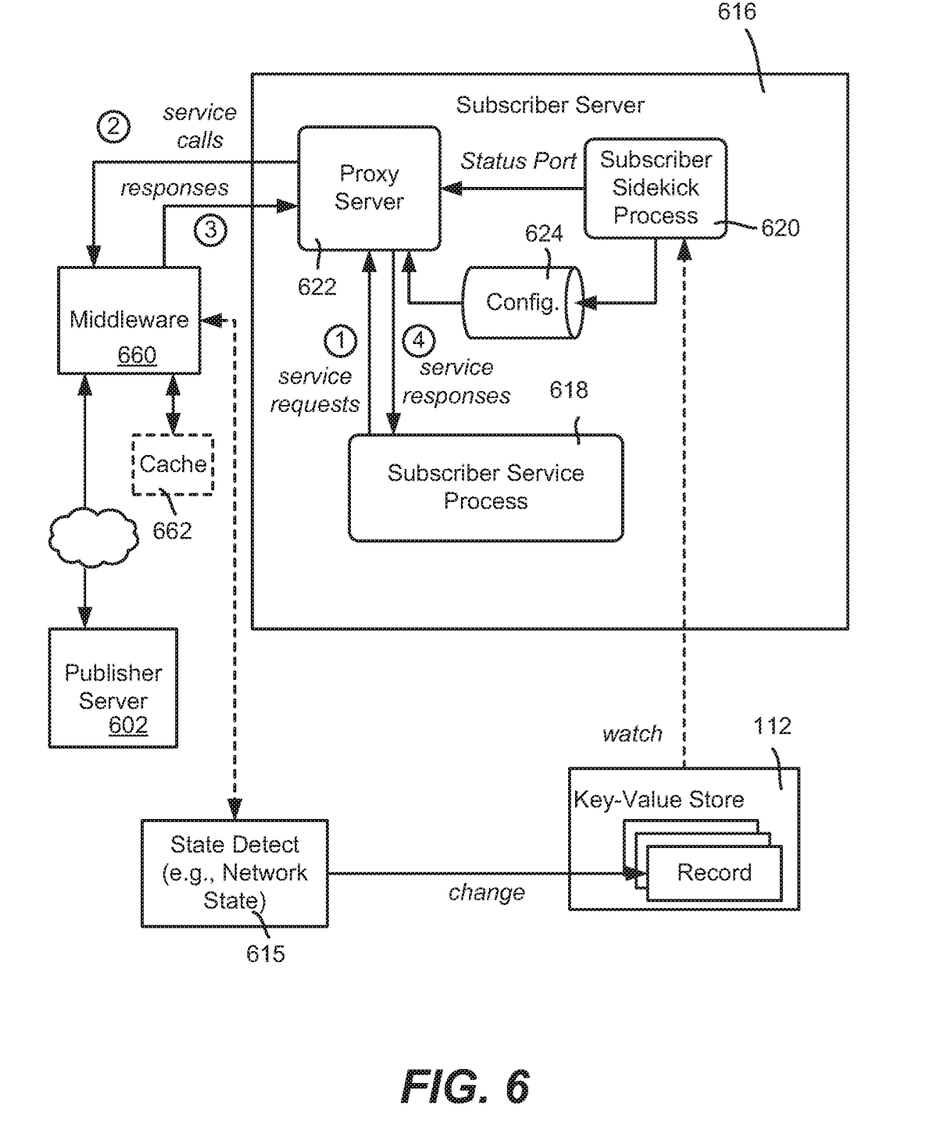
FIG. 6 is an example block diagram representation of how state detection, such as corresponding to a change in network state, may be used to dynamically change network communication, including when middleware is present, according to one or more example implementations.

FIG. 6 shows another feasible scenario in which a network change may result in the subscriber and publisher changing their operations. In this example, middleware 660 resides between the subscriber server 616 and the publisher server 602. Network state data, or possibly manual reconfiguration or the like, may be used to change the middleware 660 operation, such as to use or not use a cache 662. Again, because the subscriber server 616 (and possibly the publisher server 602's publisher service) may need to know about such a change, the information may be written to the key-value store 112; note that the middleware may be required to notify the repository in some way. Alternatively, the repository may be responsible for controlling the middleware operation, e.g., the state change causes the repository to turn on caching at the middleware, in conjunction with notifying any subscriber (or publisher) via sidekick monitoring or the like of the change.

It should be noted that the middleware 660 and its available functionality is not limited to a single software component. Instead, there may be multiple middleware implementation options, and the depicted middleware 660 may comprise any number of libraries and/or services that may be involved in changing communication behavior. Choosing among such options is independent of the subscriber or publisher implementation, however selection is a policy choice manifested via configuration data.

Figure 7A:
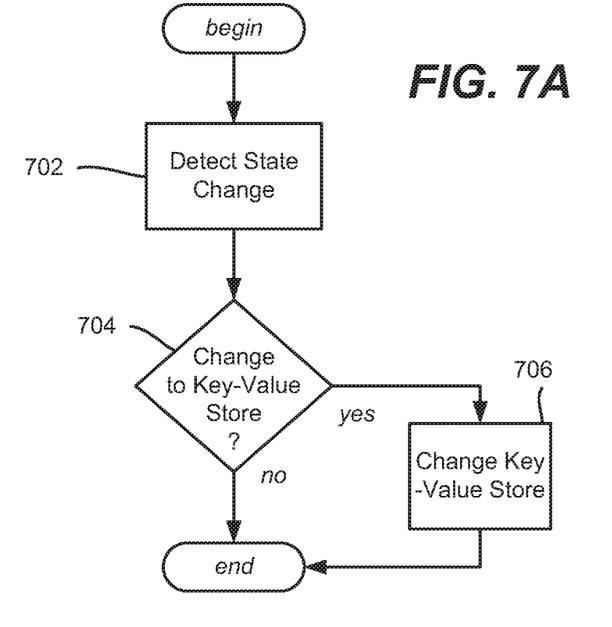
FIG. 7A is a flow diagram showing example steps that may be taken to change communication parameters via a key-value store when a state change is detected, according to one or more example implementations.

FIG. 7A shows example steps that may be taken by a publisher or a repository to make a change corresponding to a detected state change. In FIG. 7A, a state change is detected at step 702. If at step 704 rules or the like determine that the state change needs to be written to the key-value store, step 706 writes the appropriate change information. Thus, for example, if a publisher wants to turn on transactional messaging, (via some detected state change, which may be a request from a subscriber or any other state change), step 706 writes this change to the key-value store, whereby any subscribers of this publisher service are notified and may take appropriate action. Note that step 704 allows for ignoring a state change; for example, a publisher or the repository may receive a state change indicating that network latency is high, but not high enough to justify taking any action yet.

Figure 7B:
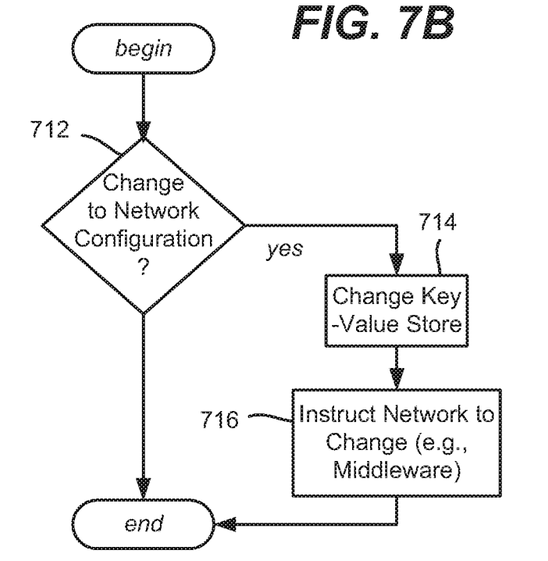
FIG. 7B is a flow diagram showing example steps that may be taken to change communication parameters via a key-value store when a network state change occurs, according to one or more example implementations.

FIG. 7B shows example steps that may be taken by a repository to make a change corresponding to a network configuration change, e.g., requested by middleware or a publisher. For example, consider that the middleware 660 of FIG. 6 has requested to make some change to the network configuration, such as to turn on caching as described above. Step 712 determines whether this change is allowed, and if so, changes the key-value store at the relevant record or records to update listeners (subscribers and/or publishers) registered to monitor changes to those records. Step 716 instructs the relevant network entity or entities to make the network change.

Figure 8:
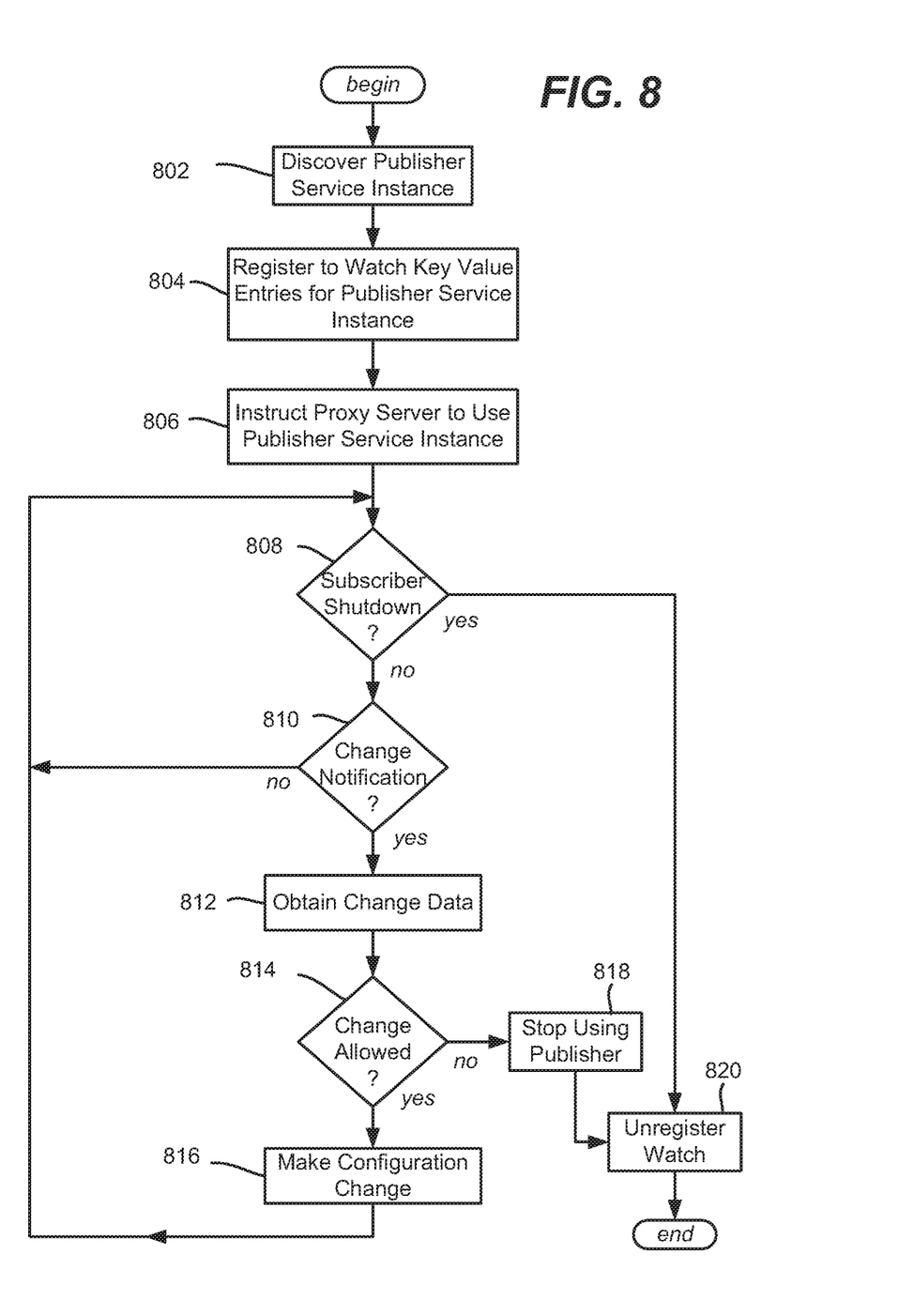
FIG. 8 is a flow diagram showing example steps that may be taken by a sidekick process of a subscriber service to change communication data, according to one or more example implementations.

FIG. 8 is a flow diagram showing example steps that may be taken by a subscriber sidekick process, beginning at step 802 where a publisher instance is discovered. Step 804 represents registering to watch for configuration data changes relevant to the publisher service instance. Step 806 represents instructing the proxy server to begin using the instance, e.g., add it to the load balancing rotation.

Step 808 represents detecting shutdown of the subscriber. If this occurs, the watch may be canceled at step 820.

Step 810 represents evaluation for a change notification, which in one or more implementations is an event/notification (rather than a "branch/loop" from step 810) from the repository. If a change occurred, step 812 represents obtaining the change data, (which may be a separate read operation, or may be included as part of the notification).

If the change is one that is allowed, as evaluated at step 814, step 816 makes the configuration change, which the proxy server/load balancer begins using as described herein. Otherwise the subscriber stops using the publisher (step 818), and cancels the watch of this publisher at step 820.

Example Computing Device

The techniques described herein can be applied to any device or set of devices (machines) capable of running programs and processes. It can be understood, therefore, that servers including physical and/or virtual machines, personal computers, laptops, handheld, portable and other computing devices and computing objects of all kinds including cell phones, tablet/slate computers, gaming/entertainment consoles and the like are contemplated for use in connection with various implementations including those exemplified herein. Accordingly, the general purpose computing mechanism described below with reference to FIG. 9 is but one example of a computing device.

Implementations can partly be implemented via an operating system, for use by a developer of services for a device or object, and/or included within application software that operates to perform one or more functional aspects of the various implementations described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 9:
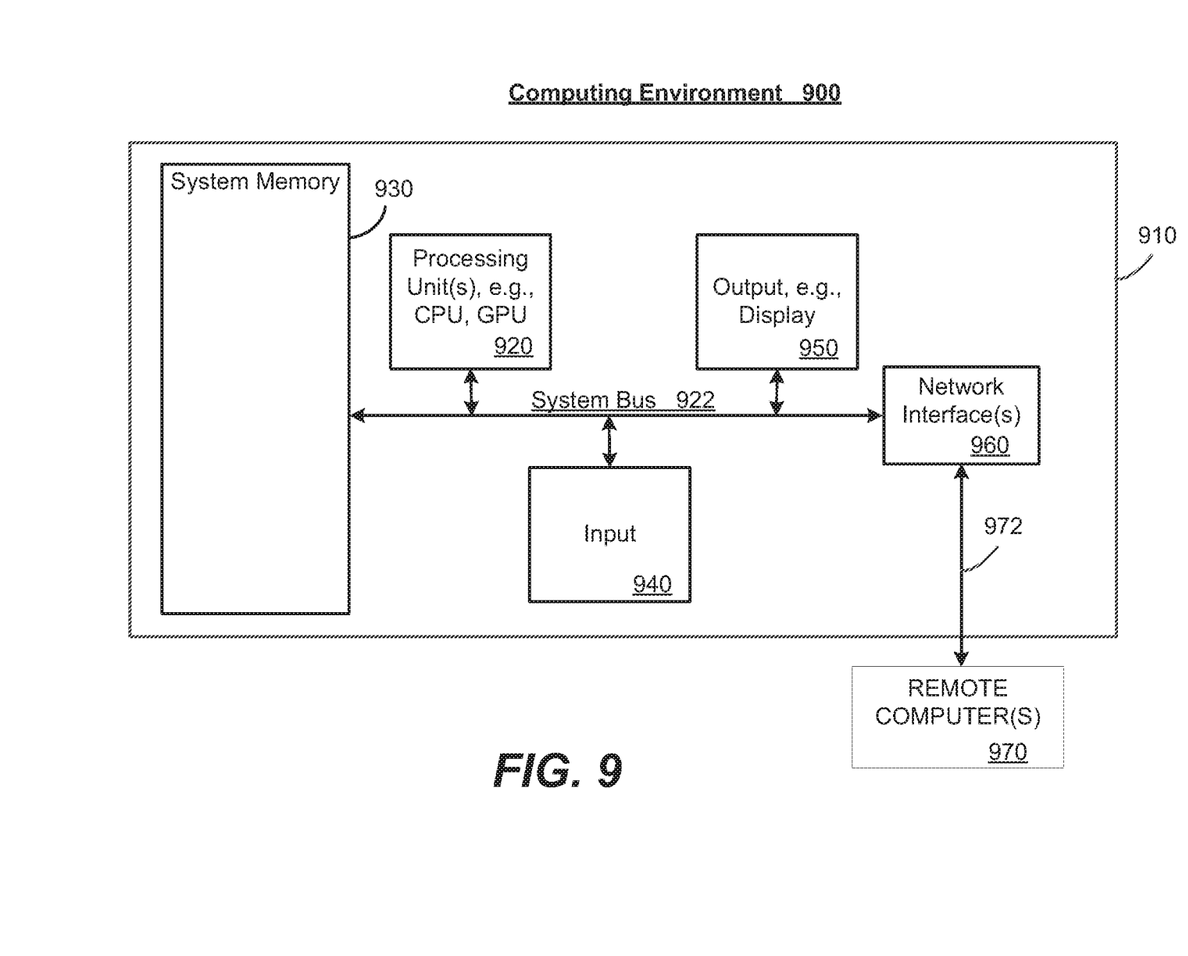
FIG. 9 is a block diagram representing an example computing environment into which aspects of the subject matter described herein may be incorporated.

FIG. 9 thus illustrates an example of a suitable computing system environment 900 in which one or aspects of the implementations described herein can be implemented, although as made clear above, the computing system environment 900 is only one example of a suitable computing environment and is not intended to suggest any limitation as to scope of use or functionality. In addition, the computing system environment 900 is not intended to be interpreted as having any dependency relating to any one or combination of components illustrated in the example computing system environment 900.

With reference to FIG. 9, an example device for implementing one or more implementations includes a general purpose computing device in the form of a computer 910. Components of computer 910 may include, but are not limited to, a processing unit 920, a system memory 930, and a system bus 922 that couples various system components including the system memory to the processing unit 920.

Computer 910 typically includes a variety of machine (e.g., computer) readable media and can be any available media that can be accessed by a machine such as the computer 910. The system memory 930 may include computer storage media in the form of volatile and/or nonvolatile memory such as read only memory (ROM) and/or random access memory (RAM), and hard drive media, optical storage media, flash media, and so forth. By way of example, and not limitation, system memory 930 may also include an operating system, application programs, other program modules, and program data.

A user can enter commands and information into the computer 910 through one or more input devices 940. A monitor or other type of display device is also connected to the system bus 922 via an interface, such as output interface 950. In addition to a monitor, computers can also include other peripheral output devices such as speakers and a printer, which may be connected through output interface 950.

The computer 910 may operate in a networked or distributed environment using logical connections to one or more other remote computers, such as remote computer 970. The remote computer 970 may be a personal computer, a server, a router, a network PC, a peer device or other common network node, or any other remote media consumption or transmission device, and may include any or all of the elements described above relative to the computer 910. The logical connections depicted in FIG. 9 include a network 972, such as a local area network (LAN) or a wide area network (WAN), but may also include other networks/buses. Such networking environments are commonplace in homes, offices, enterprise-wide computer networks, intranets and the internet.

As mentioned above, while example implementations have been described in connection with various computing devices and network architectures, the underlying concepts may be applied to any network system and any computing device or system in which it is desirable to implement such technology.

Also, there are multiple ways to implement the same or similar functionality, e.g., an appropriate API, tool kit, driver code, operating system, control, standalone or downloadable software object, etc., which enables applications and services to take advantage of the techniques provided herein. Thus, implementations herein are contemplated from the standpoint of an API (or other software object), as well as from a software or hardware object that implements one or more implementations as described herein. Thus, various implementations described herein can have aspects that are wholly in hardware, partly in hardware and partly in software, as well as wholly in software.

The word "example" is used herein to mean serving as an example, instance, or illustration. For the avoidance of doubt, the subject matter disclosed herein is not limited by such examples. In addition, any aspect or design described herein as "example" is not necessarily to be construed as preferred or advantageous over other aspects or designs, nor is it meant to preclude equivalent example structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the example systems described herein, methodologies that may be implemented in accordance with the described subject matter can also be appreciated with reference to the flowcharts/flow diagrams of the various figures. While for purposes of simplicity of explanation, the methodologies are shown and described as a series of blocks, it is to be understood and appreciated that the various implementations are not limited by the order of the blocks, as some blocks may occur in different orders and/or concurrently with other blocks from what is depicted and described herein. Where non-sequential, or branched, flow is illustrated via flowcharts/flow diagrams, it can be appreciated that various other branches, flow paths, and orders of the blocks, may be implemented which achieve the same or a similar result. Moreover, some illustrated blocks are optional in implementing the methodologies described herein.

CONCLUSION

While the invention is susceptible to various modifications and alternative constructions, certain illustrated implementations thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, the operations comprising:
maintaining a repository that registers publisher services and maintains respective datasets of configurable communication data for respective registered publisher services;
coupling, via a proxy server, a subscriber service to a first publisher service using a first identity of the first publisher service, wherein the proxy server communicates on behalf of the subscriber service with the publisher service using a first dataset of configurable communication data associated with the first identity;

registering, with the repository, a sidekick process associated with the subscriber service, for detection of changes related to publisher services that are relevant to the subscriber service;

detecting, via the sidekick process, a state change to a service registry associated with the repository, in which the state change corresponds to a change in the first dataset of configurable communication data used by the proxy server; and in response to the detecting the state change:
mapping, via the sidekick process, the first identify associated with the first dataset of configurable communication data to a second identity of a second publisher service associated with a second dataset of configurable communication data, and notifying, via the sidekick process, the proxy service to employ the mapping to process requests for the first identity of the first publisher service from the subscriber service using the second identity of the second publisher service using the second dataset of configurable communication data.

2. The system of claim 1, wherein the state change relates to a health of the first publisher service.

3. The system of claim 1, wherein the state change relates to at least one of: protocol, persistent queuing, exactly once communication, at least once communication, remote procedure call communication, synchronous/asynchronous event messaging, light-weight message-oriented middleware, message batching, message caching, capability-based authentication and authorization between subscribers and publishers, transactional communications, or security protocols.

4. The system of claim 1, wherein the detecting the state change comprises communicating between the repository and middleware.

5. The system of claim 1, wherein the state change relates to a latency condition.

6. The system of claim 5, wherein the operations further comprise selecting the second publisher service based on a parameter associated with the state change.

7. The system of claim 1, wherein the operations further comprise:
querying a publisher service for a replacement publisher service for the first publisher service; and
using the replacement publisher service as the second publisher service.

8. The system of claim 1, wherein the operations further comprise, changing network configuration information, and notifying the subscriber service of the changing the network configuration information.

9. A method, comprising:
maintaining, by a system comprising a processor, a repository that registers publisher services and maintains respective datasets of configurable communication data for respective registered publisher services;
coupling, by the system via a proxy server, a subscriber service to first publisher service using a first identity of the first publisher service that abstracts the subscriber service from a first configurable communication dataset associated with the first identity, wherein the proxy server communicates with the first publisher service on behalf of the subscriber service using the first configurable communication dataset;

registering, by the system with the repository, a sidekick process associated with the subscriber service, for detection of changes related to publisher services that are relevant to the subscriber service;

detecting, by the system via the sidekick process, a state change that corresponds to a change in the first configurable communication dataset; and in response to the detecting the network configuration change:
mapping, by the system via the sidekick process, the first identify associated with the first configurable communication dataset to a second identity of a second publisher service associated with a second configurable communication dataset, and notifying, by the system via the sidekick process, the proxy service to employ the mapping to process requests for the first identity of the first publisher service from the subscriber service using the second identity of the second publisher service using the second configurable communication dataset.

10. The method of claim 9, wherein the state change relates to a health of the first publisher service.

11. The method of claim 9, wherein the state change corresponds to activating caching.

12. The method of claim 9, wherein the state change corresponds to activating caching in middleware between the first publisher service with the subscriber service.

13. The method of claim 9, wherein the state change relates to a latency condition.

14. The method of claim 13, further comprising selecting the second publisher service based on a parameter associated with the state change.

15. The method of claim 9, further comprising:
querying, by the system, a publisher service for a replacement publisher service for the first publisher service; and
employing, by the system, the replacement publisher service as the second publisher service.

16. A non-transitory machine-readable medium, comprising executable instructions that, when executed by a processor of a system, facilitate performance of operations, comprising:
facilitating associating a first publisher service with a first identity maintained in a repository;
facilitating coupling, via a proxy server, a subscriber service to the first publisher service via the first identity, wherein the proxy server communicates on behalf of the subscriber service with the first publisher service using a first configurable communication parameter dataset;

facilitating registering, with the repository, a sidekick process associated with the subscriber service, for detection of changes related to publisher services that are relevant to the subscriber service;

facilitating detecting, via the sidekick process, a communication-related change associated the first publisher service; and in response to the detecting the communication-related change:
facilitating mapping, via the sidekick process, the first identify associated with the first configurable communication parameter dataset to a second identity of a second publisher service associated with a second configurable communication parameter dataset, and facilitating communicating, via the sidekick process, a notification to the proxy server to employ the mapping to process requests for the first identity of the first publisher service from the subscriber service using the second identity of the second publisher service using the second configurable communication parameter dataset.

17. The non-transitory machine-readable medium, comprising of claim 16, wherein the detecting the communication-related change comprises detecting a change to at least one of: protocol data, persistent queuing data, exactly once communication, at least once communication, remote procedure call communication, synchronous/asynchronous event messaging, light-weight message-oriented middleware, message batching, message caching, capability-based authentication and authorization between subscribers and publishers, transactional communications, or security protocols.

18. The non-transitory machine-readable medium, comprising of claim 16, wherein the detecting the communication-related change comprises detecting a change of a health of the first publisher service.

19. The non-transitory machine-readable medium, comprising of claim 18, wherein the detecting the communication-related change comprises detecting a latency change associated with the first publisher service.

20. The non-transitory machine-readable medium, comprising of claim 16, wherein the operations further comprise selecting the second publisher service based on a parameter associated with the communication-related change.

\* \* \* \* \*